United States Patent
Hitchings (10) Patent No.: US 6,968,944 B2
(45) Date of Patent: Nov. 29, 2005

(54) DATA DISK HOLDER WITH FIRM LAMINATED BACKING SUITABLE FOR BINDING

(75) Inventor: Timothy J. Hitchings, Isanti, MN (US)

(73) Assignee: Vinyl Art, Inc., Minneapolis, MN (US)

( * ) Notice: Subject to any disclaimer, the term of this patent is extended or adjusted under 35 U.S.C. 154(b) by 371 days.

(21) Appl. No.: 10/324,193

(22) Filed: Dec. 19, 2002

(65) Prior Publication Data

US 2004/0026278 A1 Feb. 12, 2004

Related U.S. Application Data

(60) Provisional application No. 60/402,349, filed on Aug. 8, 2002.

(51) Int. Cl.$^7$ ............................................. B65D 85/57
(52) U.S. Cl. ................................... 206/308.1; 206/232
(58) Field of Search ............................ 206/232, 308.1, 206/311, 312, 472, 473

(56) References Cited

U.S. PATENT DOCUMENTS

| | | |
|---|---|---|
| 3,507,444 A | 4/1970 | Werby |
| 4,549,658 A | 10/1985 | Sfikas |
| 4,709,812 A | 12/1987 | Kosterka |
| 4,838,708 A | 6/1989 | Holcomb et al. |
| 5,002,220 A | 3/1991 | Safranski |
| 5,101,973 A | 4/1992 | Martinez |
| 5,188,228 A | 2/1993 | Barrett |
| 5,188,230 A | 2/1993 | O'Brien et al. |
| 5,207,717 A | 5/1993 | Manning |
| 5,307,927 A | 5/1994 | Curtis et al. |
| 5,366,074 A | 11/1994 | O'Brien et al. |
| 5,422,875 A | 6/1995 | Bribach |
| 5,450,953 A | 9/1995 | Reisman |
| 5,460,265 A | 10/1995 | Kiolbasa |
| 5,462,160 A | 10/1995 | Youngs |
| 5,518,488 A | 5/1996 | Schluger |
| 5,590,912 A | 1/1997 | Stevens |
| 5,595,293 A | 1/1997 | Miller |
| 5,600,628 A | 2/1997 | Spector |
| 5,609,258 A | 3/1997 | Spector |
| 5,638,953 A | 6/1997 | House |
| 5,657,867 A | 8/1997 | Fu et al. |
| 5,669,491 A | 9/1997 | Pettey |
| 5,690,220 A | 11/1997 | Swan |
| 5,694,743 A | 12/1997 | Beighle |
| 5,697,497 A | 12/1997 | Mallery |
| 5,713,605 A | 2/1998 | Pace et al. |
| 5,715,937 A | 2/1998 | Oshry et al. |
| 5,775,491 A | 7/1998 | Taniyama |
| 5,782,349 A | 7/1998 | Combs |

(Continued)

Primary Examiner—John A. Ricci
(74) Attorney, Agent, or Firm—Schroeder & Siegfried, P.A.

(57) ABSTRACT

A data disk holder which includes a firm backing panel is constructed of a lamination of paperboard and heat-sealable plastic materials that has enhanced structural integrity suitable for use in a bindery process. A top panel of compatibly heat-sealable material is fused to the plastic lamina of the backing panel to form an interior pocket therebetween with an opening for receipt of a data disk. The firm paperboard backing is consistent with other bound pages, thereby improving handling and efficiency during binding operations, and the opening-defining edge of the holder may be bound shut to fully enclose the data disk for permanent storage. An optional security access window may be provided for access to the stored data disk, and an alternative adhesive closure strip may be used to secure the data disk holder opening.

33 Claims, 6 Drawing Sheets

U.S. PATENT DOCUMENTS

| | | |
|---|---|---|
| 5,788,069 A | 8/1998 | Calhoun, III et al. |
| 5,788,114 A | 8/1998 | Perego |
| 5,826,717 A | 10/1998 | Eskandry |
| 5,857,565 A | 1/1999 | Baker et al. |
| 5,875,614 A | 3/1999 | Youngs et al. |
| 6,202,839 B1 | 3/2001 | Petersen et al. |
| 6,360,889 B1 | 3/2002 | Combs |
| 6,571,945 B1 * | 6/2003 | Combs .................... 206/308.1 |
| 6,688,648 B2 * | 2/2004 | McKinney et al. ........... 281/12 |
| 2002/0070135 A1 | 6/2002 | Sanders |

* cited by examiner

DATA DISK HOLDER WITH FIRM LAMINATED BACKING SUITABLE FOR BINDING

CROSS REFERENCE TO RELATED APPLICATIONS

This is an application for a patent which is also disclosed in Provisional Application Ser. No. 60/402,349, filed on Aug. 8, 2002 by the same inventor, namely Timothy J. Hitchings, and entitled "POCKET HOLDER WITH FIRM BACKING SUITABLE FOR USE IN BINDERY PROCESS," the benefit of the filing date of which is hereby claimed.

BACKGROUND OF THE INVENTION

The present invention relates generally to the art of storage devices for recorded data disks, such as compact disks and the like. More particularly, the present invention is directed to a data disk holder having suitable structural integrity to facilitate easy handling and binding thereof into a perfect-bound publication during a bindery process.

With the increasing demand for information and the proliferation of the use of data disks (i.e., CD's, DVD's, etc.) to store such information, it has become increasingly common for bound publications such as books and magazines to be sold with an accompanying data disk(s) containing supplemental information which compliments and/or augments the information contained in the bound publication. While early efforts to include such data disks with bound publications included adhesively securing a data disk holder to the back cover of the publication, or packaging the bound publication and data disk in an exterior package, more recent efforts have been directed toward the use of data disks holders which can be perfect-bound directly into the book or magazine during the bindery process.

The ability to perfect bind the data disk holder into a book during the bindery process substantially reduces the labor-intensive secondary operation of manually inserting the data disk into a holder and adhesively applying the same to the inside of the book cover, or the secondary operation of packaging the bound publication and supplemental data disk holder into an exterior package to hold the same. Such labor-intensive secondary operations obviously increase handling and manufacturing costs, thus reducing the profit margin for the publication.

Perfect binding a data disk holder within a bound publication, however, presents certain manufacturing and handling issues in the signature grabbing, trimming and gluing operations of the bindery process. It has been found that conventional disk holders constructed of all plastic or vinyl suffer from structural integrity problems in that they are too pliable and easy to bend. Such holders of this type tend to damage easily either during shipping to the bindery or during the binding operation. Consequently, difficulties occur in handling the damaged disk holders in the signature grabbing and trimming operations, causing jams in the binding equipment and the need for added costly and labor intensive sorting and rework operations. Furthermore, the material inconsistency between conventional all-vinyl or plastic data disk holders and typical paper sheets of a printed publication tend to cause delays in the glue drying process of the bound pages. Since the glue on a plastic disk holder will dry slower and is less secure, it has a tendency to stick to the binding flights and pull loose during the bindery process, thereby causing additional costly rework. Safety is also a concern in that data disk holders bound within a printed publication are susceptible to theft and/or vandalism. While it is oftentimes considered desirable for the data disk holder to accommodate reusable storage for a data disk, allowing unfettered access to the disk is generally considered inadvisable. Although it is difficult to prevent theft or vandalism, it is preferable that any such reusable disk holder provide some means of indicating tampering with the contents thereof.

One attempt at producing a bindable data disk holder can be found in U.S. Pat. Ser. No. 5,713,605. This holder is designed to position the compact disk for binding within a magazine and has an outer jacket portion which is constructed from a single web of card stock that is folded over upon itself and adhesively secured together to form a pocket. Contained within the pocket is a separate disk assembly which holds a data disk and incorporates a paperboard backing with a clear plastic film that is shrink-wrapped therearound so as to entirely encompass the data disk and base portion. This assembly is then adhesively secured within the inside of the outer jacket, and is accessible through an openable flap in the jacket. The outer jacket of this data disk holder is provided with a peripheral tear strip for removable edge binding within a magazine.

The complexity of this data disk holder is readily evident. The holder is constructed of multiple components having multiple layers of card stock which, upon completion, not only increases the manufacturing cost, but also forms an overly thick and cumbersome data disk holder that will be incongruent with the remainder of the printed pages of the bound publication. In addition, such a data disk holder is not designed for reusable storage, as once it is opened, neither the inner data disk assembly nor the outer jacket is capable of containing the data disk in a storage capacity.

Another more recent attempt to create a data disk holder suitable for binding can be found in U.S. Ser. Pat. No. 6,360,889. This disk holder utilizes a pair of vinyl sheets sealed together to form a pocket within which the data disk may be stored. A separate cardboard spacer may also be carried within the pocket to secure the data disk against movement and provide consistency in thickness. The holder containing the data disk is constructed with all-vinyl peripheral land portions that facilitate trimming and binding of the holder within a bound publication. Although such peripheral land portions may be ribbed to enhance structural integrity, their all-vinyl construction is still susceptible to being easily bent, and will continue to pose problems in the glue drying process due to the inconsistency of signature materials.

From the foregoing, it is evident that there is a distinct need for a data disk holder which has sufficient structural integrity to remain flat without significant deformation during shipping and handling in the bindery process, yet substantially congruent with the other signature pages of the bound publication and constructed of a material consistent therewith to facilitate rapid and secure binding of the holder within the publication. There is also a desire for such a data disk holder to provide means for reusable storage of the data disk, as well as safety means for warning of unwanted tampering with the data disk. It is with these objectives in mind, as well as the objective of designing such a data disk holder in a cost efficient manner, that has lead to the development of the present invention which is described in detail hereafter.

BRIEF SUMMARY OF THE INVENTION

In accordance with the present invention, a data disk holder having enhanced structural integrity to facilitate handling of the same in a bindery process is provided. My improved data disk holder includes a relatively firm or rigid backing panel that is preferably constructed of a lamination comprising a paperboard base material with a layer of heat-sealable plastic material, such as polyvinylchloride ("vinyl") or polypropylene, laminated thereto. Disposed over the laminated backing panel and heat-sealed thereto is a second or top panel of heat-sealable plastic material. The top panel is preferably constructed of the same material as the plastic lamina of the backing panel, or in any event, of material heat-sealably compatible therewith. It is placed over the plastic lamina of the backing panel, and is heat-sealed thereto through known welding techniques so as to form a data disk storage pocket therebetween. The heat-seal formed between the top panel and backing panel extends generally peripherally about the outer edge portions of the data disk holder and terminates along one edge so as to provide an unsealed opening to the inner storage pocket thereof.

The data disk holder is manufactured by first laminating a clear or opaque film of heat-sealable plastic material to a paperboard base or backing material with a laminating adhesive, or through the use of other known laminating techniques. While the use of other backing materials 10 is conceivable, paperboard is preferred because it is generally consistent with the printed pages of most publications, which facilitates more consistent drying times for the data disk holder and other signatures of a publication in the bindery process. Preferably, the paperboard base is 0.008–0.010 inches thick, and the plastic lamina thereover is approximately 0.004–0.005 inches thick, depending on the material used and cost.

This laminated paperboard then provides the backing panel for the data disk holder, over which the aforementioned top layer of heat-sealable material may be fused to form the pocket therebetween. With a rectangular configuration, preferably the heat-seal between the laminated backing panel and top panel will extend along the perimeter portions of three (3) edges, leaving the fourth peripheral edge unsealed to provide the opening for insertion of the data disk within the interior pocket. In the preferred embodiment, at least the unsealed edge of the data disk holder defining the pocket opening is provided with a peripheral trim portion that may be severed during the bindery process with other printed signatures, so as to provide a clean edge prior to application of the binding glue thereto. With the opening-defining edge of the data disk holder situated to face the publication binder, application of the glue thereto will effectively seal the pocket opening while simultaneously binding the data disk holder within the bound publication.

With the pocket opening bound shut, the data disk is effectively sealed within the data disk holder. In order to access the data disk, a security access window is die-cut into the top panel that forms the pocket. The die-cut operation effectively scores an area of the top panel, thereby leaving a plurality of severable links between the top panel and the window which, when broken to access the data disk, also provides a warning or indication of tampering with the contents enclosed within the data disk holder.

In another embodiment, an alternate peripheral edge may be adapted to be bound within the publication, thereby leaving the opening defining edge of the data disk holder unsealed. In this embodiment, it is contemplated that one of the panels of the data disk holder will carry an adhesive layer adapted for sealing the opening of the data disk holder upon insertion of the disk therein. Although it is conceivable that one panel may form an adhesive fold-over flap, in the preferred construction, the adhesive layer utilized is comprised of a separate strip of heat-sealable material to which a pressure sensitive adhesive is applied, with an adhesive release strip or peel-seal disposed thereover. With the adhesive layer disposed between the two (2) panels of the data disk holder at the opening therebetween, the heat-sealable strip of the adhesive layer may be fused to either the laminated backing or top panel of the data disk holder simultaneously with the formation of the pocket therebetween. The heat-sealable strip will effectively fuse to one of the pocket panels, while the adhesive release strip facing the opposing panel insulates the same from being sealed thereto, thereby maintaining the pocket opening for receipt of the data disk therein.

To seal the opening of the data disk holder, it is then only necessary to peel off the adhesive release strip from the adhesive layer, thereby exposing the pressure sensitive adhesive and allowing the facing panel to adhere thereto. Since no fold-over flap is formed and the heat-sealable strip of the adhesive layer is extremely thin, only a slight increase in thickness occurs at the opening of the data disk holder, thereby avoiding handling problems caused in the bindery process due to non-uniform or irregular thickness of such data disk holders.

As an additional enhancement, my improved data disk holder may also include a pair of sealed edge stops formed in the interior of the pocket of the data disk holder to help retain the data disk from substantial movement therewithin. Such edge stops are formed by providing a pair of opposing heat-seals between the laminated backing and top panels, and are located in such manner as to restrict movement of a data disk inserted therewithin.

The firm paperboard backing of my improved data disk holder not only reduces the likelihood of product damage during shipping, but also improves handling and efficiency during the bindery process if so used in this manner. Either single or multiple data disk holders may be formed together and bound into a printed publication for permanent storage, or used separately, depending on the needs of the customer or end user. Given the uniform thickness, firmness, and consistency of the paperboard backing with other printed pages of a publication, however, my improved data disk holder is particularly well suited for use in a bindery process.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
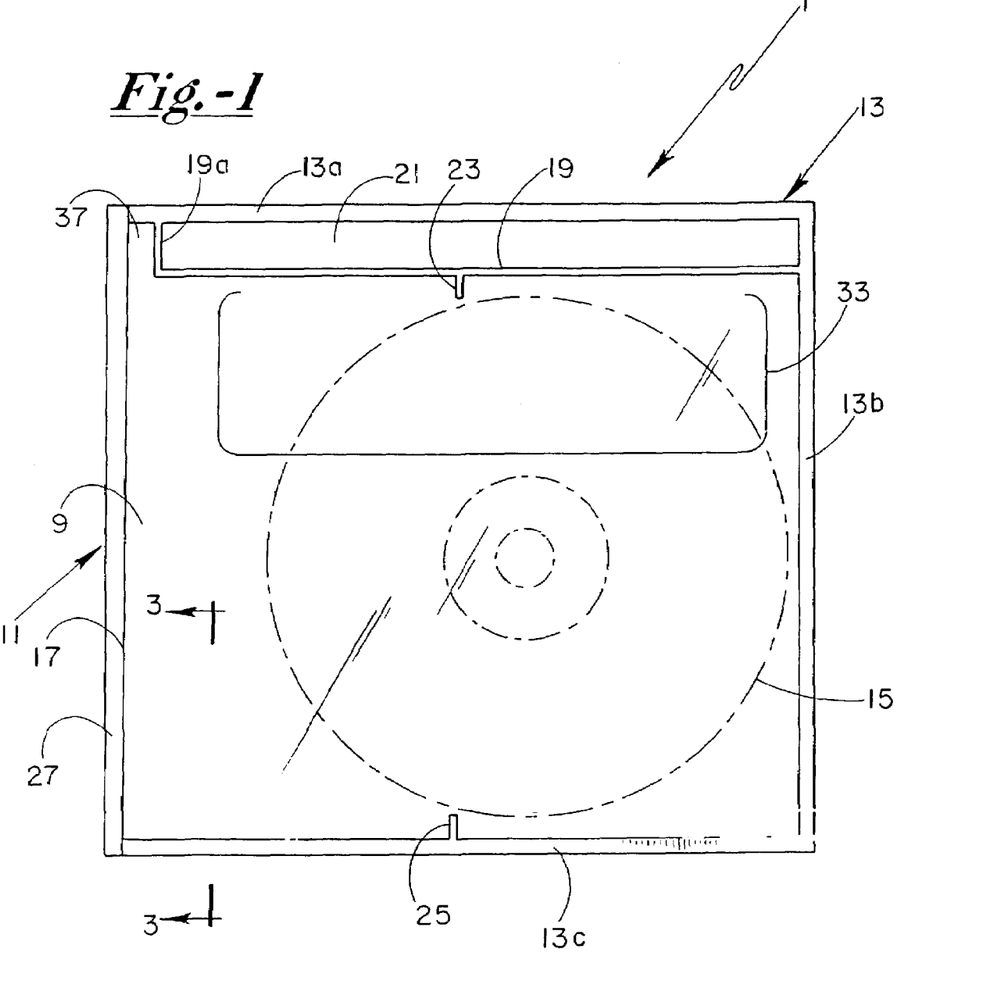
FIG. 1 is a plan view of a first embodiment of a data disk holder incorporating the principles of my invention.
Figure 2:
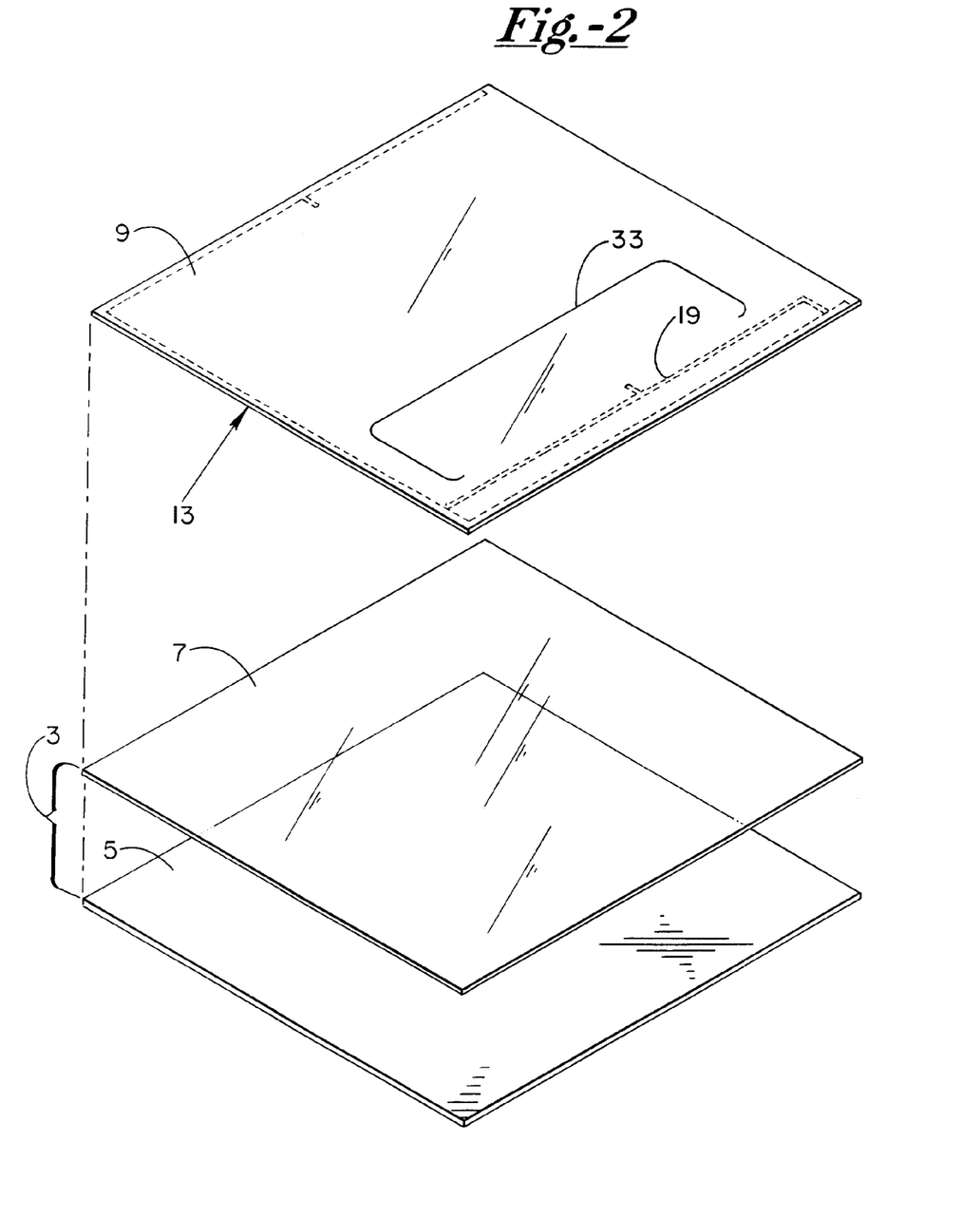
FIG. 2 is an exploded perspective view of the data disk holder shown in FIG. 1.
Figures 3, 4:
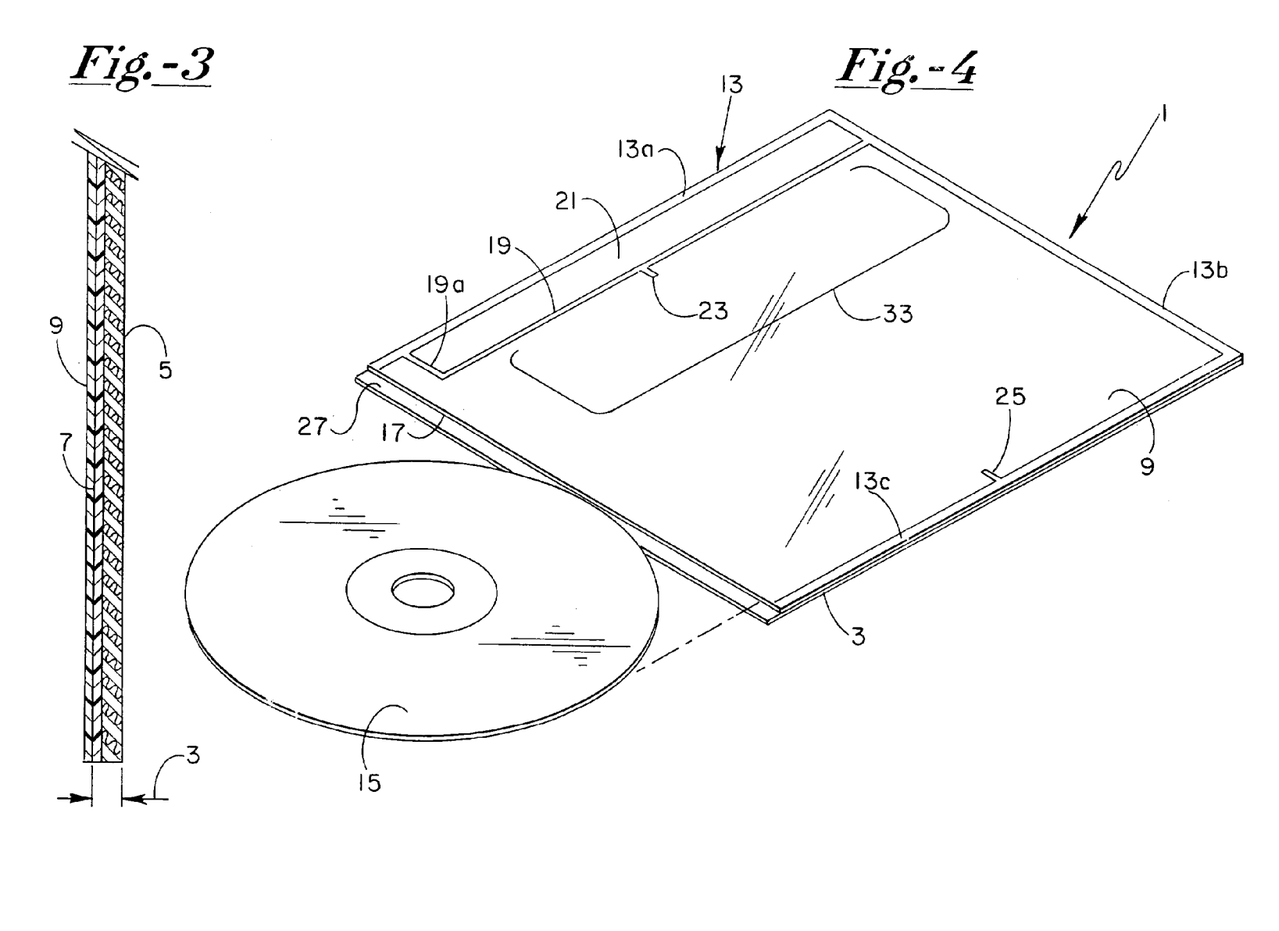
FIG. 3 is a cross-sectional view of a portion of the data disk holder shown in FIG. 1, taken along line 3—3 and enlarged to show the layered construction thereof.
FIG. 4 is a perspective view of the data disk holder shown in FIG. 1, illustrating the opening thereto and manner in which a data disk may be loaded therein.

With reference now being made to FIGS. 1, 2, and 3, a preferred embodiment of my improved data disk holder 1 having enhanced structural integrity suitable for use in a bindery process is shown. The data disk holder 1 includes a relatively firm or rigid backing panel 3 that is constructed of a lamination preferably comprising a paperboard base material 5 to which a layer of heat-sealable plastic material 7, such as vinyl or polypropylene, is laminated. In the preferred embodiment, the paperboard base 5 of the laminated backing panel 3 is preferably 0.008–0.010 inches thick, so as to provide a relatively firm structural backing for the data disk holder 1 that will not easily bend or deform during shipping or handling in a bindery process. The lamina of heat-sealable plastic material 7 is relatively thin by contrast (preferably 0.004–0.005 inches) and provides a cooperating surface to which a top panel 9 may be fused to form a pocket 11 therebetween.

Preferably, the top panel 9 is formed of the same material as lamina 7, or of another compatibly heat-sealable material thereto, and is also relatively thin (i.e., 0.004–0.005 inches) in comparison to the paperboard base 5 of the laminated backing panel 3, such that the composite thickness of the data disk holder 1 will not be substantially incongruous with the pages of the publication signatures with which it is to be bound. It will be appreciated, however, that the thickness of the various materials or panels may vary depending on the particular application, and may also vary in relation to one another, provided the data disk holder 1 maintains sufficient structural integrity suitable for use in a perfect binding process. Thus, it is conceivable that the paperboard base material 5 could be as thin as 0.004 inches, or as thick as about 0.020 inches, and still function in the desired manner. Similarly, it is also conceivable that the plastic lamina 7 of the backing panel 3 and top panel 9 could also be constructed of a thickness falling in the approximate range of 0.002–0.015 inches.

Although the preferred embodiment of my invention contemplates the use of a paperboard base material 5, it is conceivable that other relatively rigid or semi-rigid materials, or composite materials, may also be used to provide the desired firmness or structural integrity suitable to satisfy the above-stated purposes. The use of paperboard, however, has the added benefit that it is more likely to be compatible with the remaining signature pages of a printed publication with which it may be bound, thereby facilitating more consistent and faster drying times of the binding glue used therewith.

The layer of heat-sealable material 7 is laminated to at least one surface of the base material 5 with a laminating adhesive (not shown), or through the use of other known laminating techniques, such that the lamina 7 conforms snugly to the base material 5. The lamina 7 may be either transparent or opaque, depending on the intended application or end user's specifications. For instance, should the end user desire to incorporate graphics on the base material 5, a clear heat-sealable plastic lamina 7 will allow viewing of the graphics.

As shown in FIGS. 1 through 4, the top panel 9 to holder 1 is heat-sealed to the lamina 7 of backing panel 3, thereby forming at least one heat seal 13 extending about the peripheral portions of holder 1 so as to define a space or pocket 11 between backing panel 3 and top panel 9 that is appropriately sized to receive a data disk 15 therein. As shown best in FIG. 4, heat seal 13, defined by segments 13a, 13b, and 13c, extends about three adjoining edges of data disk holder 1, thereby creating an opening along the unsealed fourth edge 17 that communicates with the interior pocket 11 and provides a passage through which a data disk 15 may be received. As shown, an additional heat seal 19 is formed along one side of holder 1 and inward relative to peripheral seal 13. Seal 19 serves to limit the size of pocket 11 to closely conform to the dimensions of the data disk 15 and prevent undesirable movement thereof, and to define a peripheral trim portion 21, the benefits of which will be described in more detail hereafter. To further prevent undesirable movement of the data disk 15 within pocket 11 of holder 1, a pair of optional inwardly protruding heat-sealed edge stops 23 and 25 are formed between backing panel 3 and top panel 9. Opposing edge stops 23 and 25 extend radially inward from opposite seals 19 and 13c, respectfully, and terminate at a point such that the distance therebetween is slightly less than the diameter of the data disk 15 contained therein. Edge stops 23 and 25 are also spaced from seal segment 13b a distance slightly greater than the diameter of data disk 15. Thus, upon insertion of data disk 15 into pocket 11 of holder 1, the data disk will push past edge stops 23 and 25 to a position over-dead-center relative thereto, thereby effectively restraining the disk from substantial movement within the pocket.

As shown best in FIG. 4, the backing panel 3 of holder 1 extends slightly outward beyond top panel 9 along the unsealed edge portion 17 of holder 1. This helps to facilitate loading of the data disk 15 into the pocket 11 of holder 1 by providing a lip 27 against which the edge of the disk 15 may bear to spread or widen the opening to pocket 11 for receipt of the disk. While certainly optional, in the preferred embodiment of my invention, top panel 9 of holder 1 is transparent so that the contents of the holder are readily visible, and any graphics printed on the data disk 15 or backing panel 3 can be viewed.

Figure 5:
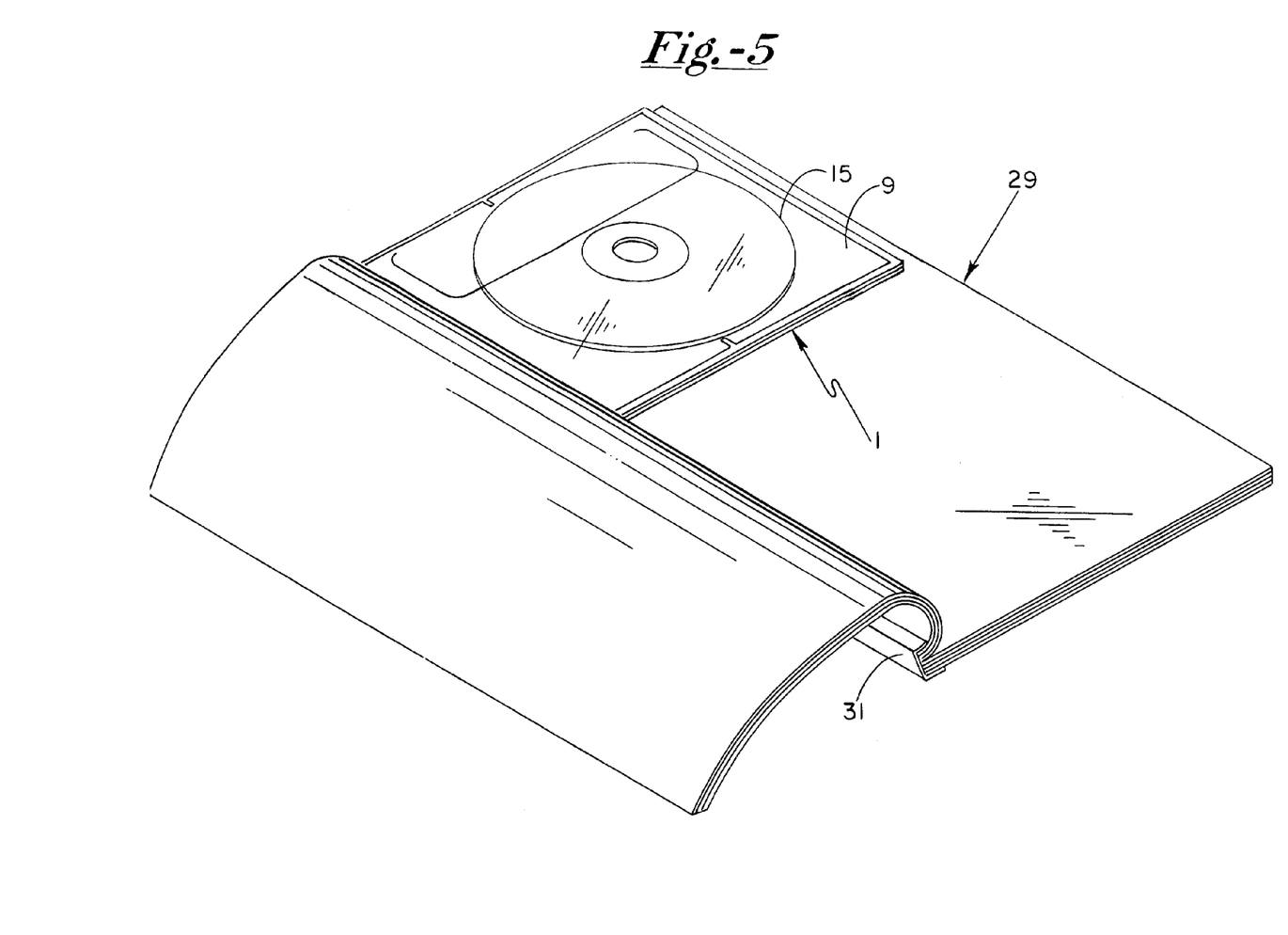
FIG. 5 is a perspective view of the data disk holder shown in FIG. 1 bound into a publication after trimming.

As will be described in more detail hereafter, in the preferred embodiment, the data disk holder 1 is suitably constructed to be perfect bound into a printed publication 29. As shown in FIG. 5, in order to ensure that the data disk 15 is secure within the pocket holder 1, the unsealed edge portion 17 of the pocket holder 1 that defines the pocket opening is aligned with the publication binding 31, such that upon application of the binding glue thereto, the unsealed edge potion 17 will be effectively sealed shut. With the pocket opening now sealed, the data disk 15 becomes completely encapsulated within the holder 1, and the holder becomes a permanent storage means therefor.

Figure 6:
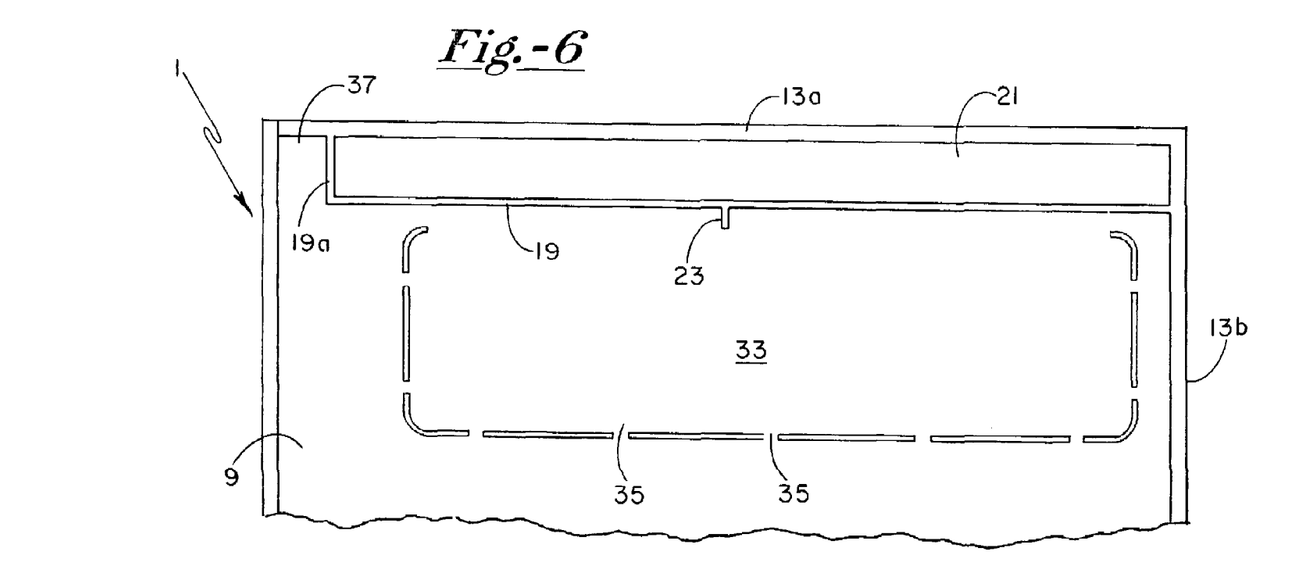
FIG. 6 is a blown up partial plan view of the data disk holder shown in FIG. 1, illustrating the scored die cut that forms the security access window thereto.

In order to provide access to the data disk 15, an optional security access window 33 may be cut in top panel 9 of holder 1. As shown best in FIG. 6, window 33 may be scored with a die-cutter such that a plurality of severable links 35 remain connecting the window 33 to panel 9. By scoring panel 9 in this manner about three sides of an area designated for window 33, access to disk 15 requires severing of the connecting links 35 and lifting of window 33. Window 33 thus acts as an indicator to warn prospective purchasers of possible tampering with the contents of holder 1 and, once opened by an end user, facilitates continued storage and retrieval of the data disk 15 from within holder 1, which remains permanently bound in publication 29.

As noted previously, in the preferred embodiment of my invention, data disk holder 1 includes a heat seal 19 that acts in part to define the confines of pocket 11, as well as an outer trim portion 21. The purpose of trim portion 21 is to facilitate ease of handling and accommodate trimming tolerances in the signature gathering and trimming operations of a perfect binding process, which are well known in the art. Depending on customer specifications, similar trim portions may be required along one or more edges of holder 1, or may not be required at all. Such trim portions 21 facilitate movement of holder 1 efficiently through the signature grabbing operation and provide a trimmable portion that may be severed along with the corresponding edge portions of other signatures to provide a clean and evenly aligned finished appearance to the publication pages. As shown in FIG. 5, the data disk holder 1 has been aligned adjacent the top edge of publication 29, and trim portion 21 has been severed along with the top edge of other publication signatures to provide a corresponding cleanly finished edge thereto. With heat seal 19 still fully intact, disk 15 remains fully encapsulated within pocket 11 of holder 1.

With reference to FIGS. 1–4, it can be seen that heat seal 19 does not extend the full length of holder 1, but rather terminates short of the unsealed edge portion 17 of holder 1 at end segment 19a. This creates an additional trim portion 37 extending along the length of the unsealed edge portion 17 of holder 1, which further facilitates trimming of edge 17 during the bindery process so as to provide a corresponding clean edge with other signatures prior to application of the binding glue thereto. By trimming part or all of region 37, lip 27 of backing panel 3 may be eliminated, thereby leaving a cleanly aligned cut through backing panel 3 and top panel 9 along edge 17. Application of the binding glue to the remaining unsealed edge 17 of holder 1 will then firmly secure the holder within publication 29, and simultaneously seal the opening at edge 17 to fully encapsulate the data disk 15 within pocket 11.

With the use of a firm paperboard base material 5 for the laminated backing panel 3, as described above, holder 1 will have sufficient structural integrity to remain in a flat form without incurring undesirable bends and folds during shipping and handling in the bindery process, thus reducing significantly the amount of scrap and rework. Since in most cases the paperboard backing is consistent with other signature components in a bindery process, it is readily handled without causing equipment malfunction. Also, the paperboard backing 5 more readily wicks the moisture away and accepts the binding glue than conventional all-plastic data disk holders, thereby facilitating more rapid and consistent drying times with other similarly paper-based signatures. With faster drying times, the data disk holder will be less apt to stick to the binding flights, since it is more securely glued within the publication, and more apt to pass through the binding press without becoming dislodged prior to application of the publication cover thereto.

The data disk holder 1 is manufactured by first laminating a clear or opaque layer of heat-sealable material 7 to the base material 5 to form the prefabricated backing panel 3. For commercial purposes, it is preferred that multiple data disk holders 1 be mass produced in a continuous manufacturing process, as illustrated diagrammatically in FIG. 7. Toward this end, it can be seen that large sheets or webs of such laminated backing panel material 39 are first produced and stored on a large reel 41, and similarly, large sheets or webs of preferably transparent heat-sealable material 43 used in the formation of top panels 9 are stored on a large reel 45.

Figure 7:
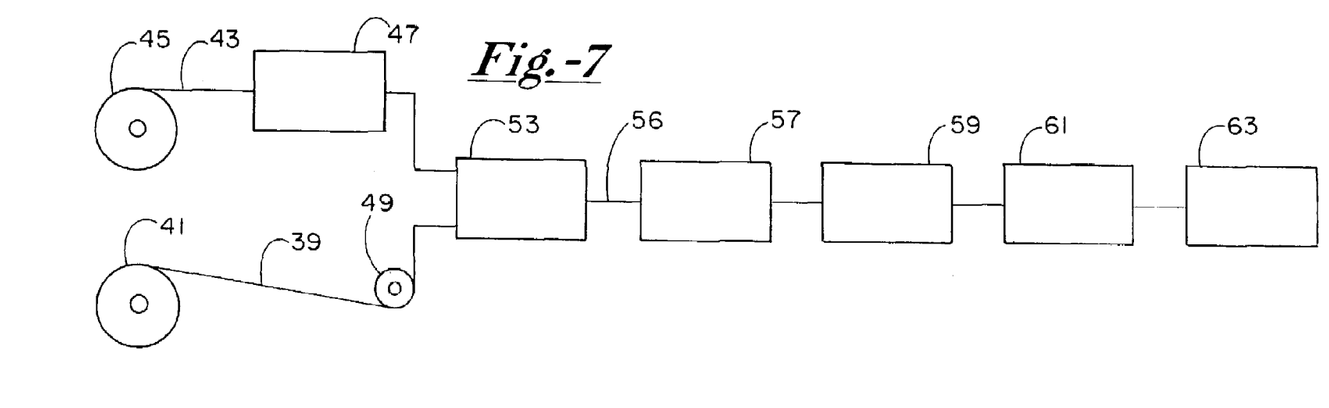
FIG. 7 is a block diagram of a known manufacturing process for mass producing the data disk holder shown in FIG. 1.

As shown in FIG. 7, the material web 43 is first routed through a die-cutter 47, where the scoring operation may be performed to define the optional security access window 33 in the top panel 9 of each holder 1 that is to be formed from web 43. The laminated material web 39, with the lamina 7 facing material web 43, simultaneously bypasses die-cutter 47 via bypass roller 49, and is advanced to the sealing head 53 where it is joined by material web 43 for thermal welding and formation of the appropriate seals that define the interior pocket 11 of each data disk holder 1.

Depending upon the heat-sealable material used in the manufacture of the data disk holder 1, thermal fusion of the top panel 9 to the lamina 7 of backing panel 3 of each holder 1 may be accomplished through the use of known thermal welding techniques used for plastics, such as RF welding, sonic or thermal contact welding. For instance, if material web 43 and the lamina of material web 39 are constructed of vinyl, RF welding is preferably used in the formation of the required seals, and if polypropylene is used as the preferred material of choice, thermal contact welding may be used in the formation of the required seals.

As shown in FIG. 7, the upper material web 43 is disposed over the lower material web 39 and simultaneously fed into sealing head 53, where multiple interconnected data disk holders 1 are formed with seals 13, 19 defining multiple individual pockets 11 at predefined locations between webs 39 and 43. Upon exiting the sealing head 53, webs 39 and 43 are effectively fused together into one web of material 55 containing a plurality of interconnected data disk holders 1. Web 55 is then fed into a rotary knife cutter 57 which longitudinally cuts and separates web 55 into separate rows of data disk holders 1. Such severed rows of holders are then advanced by indexer 59 to a second rotary cutter 61 which makes final transverse cuts to separate each of the rows into distinct units of single or multiple data disk holders 1, depending on customer requirements. Since it may be desirable in certain applications (i.e., book binding, etc.) to ship or store multiple data disks 15 together, it is contemplated that multiple data disk holders 1 may be contained on a single unit or sheet. Upon completion of the cutting operations, the individual units of data disk holders 1 are advanced to a conveyor 63 for further handling and processing.

Figure 8:
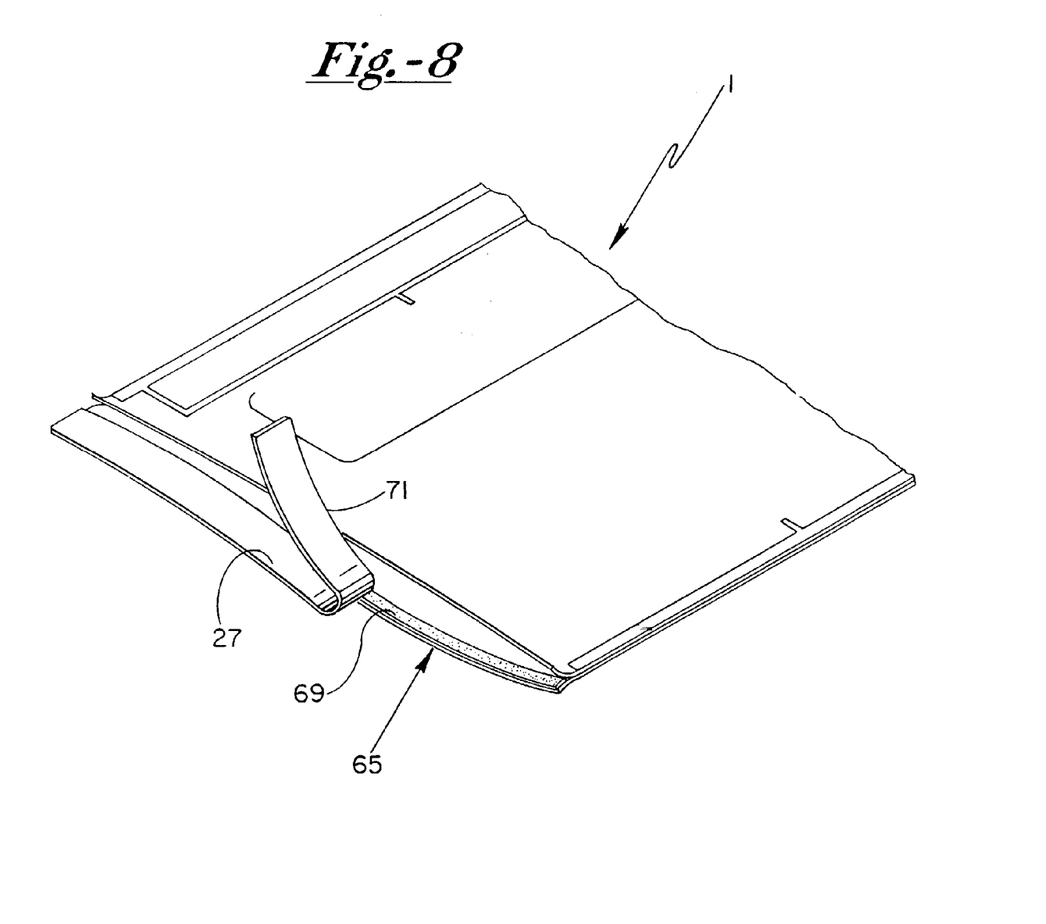
FIG. 8 is a partial perspective view of a second embodiment of a data disk holder incorporating the principles of my invention.

In an alternative embodiment of my invention, as shown in FIG. 8, it may be desirable for the unsealed edge portion 17 and opening to data disk holder 1 to include an adhesive closure means 65, rather than be bound shut with binding glue in a bindery process. In such case, the holder may be constructed in the same manner as set forth in the preferred embodiment above, except that one or more of the sealed edges of the holder may include an additional trim portion to facilitate trimming and binding of the bolder in a bound publication, thereby leaving the unsealed adhesively closable edge free. Although any form of adhesive closure may be adequate for sealing the opening to packet 11 (i.e., fold-over adhesive flap, etc.), it is preferable that the adhesive closure means be constructed in a manner as described and claimed in my copending U.S. patent application Ser. No. 10/323,275 entitled: DATA DISK HOLDER WITH ADHESIVE SEAL STRIP, the contents of which are incorporated herein by reference thereto.

When constructed in this manner, a separate adhesively-coated layer of heat-sealable material 67 is fused to the inner surface of the data disk holder 1 adjacent the unsealed opening-defining edge portion 17 thereof. This layer 67 is comprised of a relative small, thin strip 69 of compatibly heat-sealable material to which a pressure sensitive adhesive has been applied, over which an adhesive release strip or peel-seal 71 is disposed. With the adhesive layer 67 disposed between the top panel 9 and backing panel 3 of the data disk holder 1 adjacent the unsealed edge 17, the heat-sealable strip 69 of the adhesive layer 67 may be fused to either the laminated backing panel 3 or top panel 9 of the data disk holder 1 simultaneously with the formation of the pocket 11 therebetween. The heat-sealable strip 69 will effectively fuse to one of the holder panels 3 or 9, while the adhesive release strip facing the opposing panel insulates the same from being sealed thereto, thereby maintaining the pocket opening 11 for receipt of the data disk 15 therein.

To seal the opening of the data disk holder, it is then only necessary to peel off the adhesive release strip 71 from the adhesive layer 67, thereby exposing the pressure sensitive adhesive and allowing the facing panel to adhere thereto. Since the heat-sealable strip 69 of the adhesive layer 67 is also extremely thin, only a slight increase in thickness occurs at the opening of the data disk holder 1, thereby avoiding handling problems caused in the bindery process due to non-uniform or irregular thickness of such data disk holders.

As is evident from the foregoing, an improved data disk holder 1 incorporating the principles of my invention has numerous advantages over prior art devices that are constructed of pliable all-plastic materials. By utilizing a firm paperboard backing panel 3, the data disk 15 may be loaded into the holder 1 and subsequently shipped to a bindery to be bound into a publication without concern of damage. The enhanced structural integrity of such a data disk holder 1 will prevent undesirable bends and folds that are common causes for damage during shipping, and manufacturing failures during the bindery process. Because the backing material 5 is constructed of a similar material as most printed pages of a publication, handling problems are reduced at the bindery, and glue drying times are more consistent. By laminating the base material 5 to form backing panel 3, all of the aforementioned advantages are obtained, yet a readily heat-sealable surface is created to which the thin top panel 9 can be fused to form the pocket 11 of the data disk holder. The resulting holder not only has the structural integrity necessary for use in a bindery process, but is also sufficiently thin so as not to be incongruous with the remainder of the pages to be bound in the publication. Combining these attributes into such a data disk holder will help to increase efficiency of the bindery process and lower binding costs attributable to down-time of the binding equipment and required rework of data disk holders, as well as help to reduce the cost of scrap and transit spoilage.

It will, of course, be understood that various changes may be made in the form, details, arrangement and proportions of the parts without departing from the scope of the invention which comprises the matter shown and described herein and set forth in the appended claims.

What is claimed is:

1. A data disk holder suitable for binding, comprising:
   (a) a first panel of pliable heat-sealable material;
   (b) a second panel to which said first panel may be heat-sealed, said second panel comprising a lamination of heat-sealable material and a relatively rigid backing material;
   (e) at least one heat seal connecting said first panel to said second panel and forming a pocket therebetween for holding the data disk; and
   (d) a sealable opening formed by said first panel and said second panel to facilitate insertion of the data disk within said pocket defined by said first and second panels.

2. The data disk holder of claim 1, wherein said backing material of said second panel is formed of a material consistent with that of a book signature with which it is to be bound.

3. The data disk holder of claim 1, wherein said first panel is comprised of a thermoplastic material, and said second panel is a lamination of a thermoplastic material and paperboard, said first panel being heat-sealed to said thermoplastic layer of said second panel.

4. The data disk holder of claim 1, wherein said first and second panels are constructed and arranged such that said pocket opening will be bound shut during a bindery process, thereby enclosing the data disk within said pocket in secure relation.

5. The data disk holder of claim 1, wherein said first and second panels include severable trim portions adjacent said pocket opening to facilitate trimming and binding thereof during a bindery process.

6. The data disk holder of claim 1, wherein said first panel includes a scored area defining an access window which may be broken open for access to said pocket between said first and second panels.

7. The data disk holder of claim 1, wherein said first and second panels are rectangular in shape, said first panel being heat-sealed to said heat-sealable material of said second panel along three peripheral edges thereof, thereby forming said pocket between said first and second panels, and defining said sealable opening along the fourth peripheral edge thereof for receiving the data disk.

8. The data disk holder of claim 7, wherein said first and second panels have sufficient composite thickness and rigidity to facilitate ease of handling and binding within a bound publication during a bindery process.

9. The data disk holder of claim 1, wherein said backing material is constructed of a paperboard material having a thickness in the approximate range of 0.008 to 0.010 inches.

10. The data disk holder of claim 1, wherein said backing material has a pair of opposite faces, and said heat-sealable material of said second panel is laminated to at least one of said faces of said backing material.

11. The data disk holder of claim 1, wherein said first and second panels have corresponding opposing unsealed peripheral portions defining said opening to said pocket, at least one of said panels carrying an adhesive layer adjacent said opening for adhering said panels together.

12. The data disk holder of claim 11, wherein said adhesive layer is comprised of an adhesive coating carried on a third panel of heat-sealable material that is fused to one of said first or second panels.

13. The data disk holder of claim 12, wherein said third panel is disposed between said opposing unsealed peripheral portions of said first and second panels, and said adhesive layer carries an adhesive release strip which prevents adhesion between said first and second panels until removal thereof from said adhesive layer.

14. A data disk holder suitable for binding, comprising:
   (a) a first panel constructed of a pliable polymeric material;

(b) a second panel to which said first panel may be adhered, said second panel comprising a relatively rigid backing material laminated with a polymeric material;

(c) said first panel being adhered to said second panel and forming a pocket therebetween for holding the data disk; and (d) a sealable opening formed by said first panel and said second panel to facilitate insertion of the data disk within said pocket defined by said first and second panels.

15. The data disk holder of claim 14, wherein said backing material of said second panel is formed of a material consistent with that of a book signature with which it is to be bound.

16. The data disk holder of claim 15, wherein said first and second panels have peripheral portions defining said opening for receipt of the data disk into said pocket, said peripheral portions of said first and second panels defining said opening being constructed and arranged to be bound together in a bindery process so as to close said opening and secure the data disk within said disk holding pocket.

17. The data disk holder of claim 14, wherein said backing material is constructed of paperboard having a thickness within the range of 0.008 to 0.010 inches.

18. The data disk holder of claim 14, wherein said second panel is comprised of a paperboard backing material having opposite faces, and said polymeric laminate material is adhered to one of said faces.

19. The data disk holder of claim 14, wherein one of said panels carries an adhesive layer adjacent said opening, said adhesive layer being comprised of a separate polymeric strip having a pressure sensitive adhesive coating applied thereto.

20. The data disk bolder of claim 19, wherein said adhesive layer is thermally fused to one of said panels with said adhesive coating facing the other of said panels.

21. A data disk holder suitable for binding, comprising:
(a) a first sheet of plastic material;
(b) a second sheet to which said first sheet may be fused, said second sheet comprising a plastic and paperboard laminate that is more rigid than said first sheet;
(c) said first plastic sheet being fused to said plastic layer of said second sheet and forming a pocket therebetween for receiving and holding the data disk; and
(d) a sealable opening formed by said first sheet and said second sheet to facilitate insertion of the data disk within said pocket defined by said first and second sheets.

22. The data disk holder of claim 21, wherein said second sheet comprises a paperboard backing with a thermoplastic laminate thereover.

23. The data disk holder of claim 22, wherein said paperboard backing has opposite faces, said thermoplastic laminate being applied to one of said faces.

24. The data disk holder of claim 21, wherein said first and second sheets are rectangular in shape with corresponding edge portions that are sealed together on three sides, said corresponding edge portions on the fourth side being substantially unsealed to form said opening to said pocket.

25. The data disk holder of claim 24, wherein said first and second sheets include a severable trim disposed along at least said edge portions defining said opening, to facilitate trimming and binding of the data disk holder in a bound publication with said opening sealed shut.

26. The data disk holder of claim 21, wherein said first and second sheets form a pair of edge stops within said pocket for retaining the data disk therein.

27. The data disk holder of claim 26, wherein said pocket includes peripherally sealed edge portions, and said edge stops comprise a pair of opposing seals between said first and second sheets which extend inwardly toward the interior of said pocket from said peripherally sealed edge portions thereof.

28. The data disk holder of claim 21, including a disk access window formed in said first sheet.

29. The data disk holder of claim 21, including a plastic adhesive strip disposed between and fused to one of said first and second sheets adjacent said opening to said pocket.

30. The data disk holder of claim 29, wherein said plastic adhesive strip includes a strip of plastic material coated on one surface with an adhesive over which an adhesive release strip is disposed to prevent adhesion until closure of said opening is desired.

31. A data disk holder suitable for binding, comprising:
(a) a first panel of pliable heat-sealable material;
(b) a second panel comprising a lamination of heat-sealable material and a relatively rigid backing material;
(c) at least one heat seal connecting said first panel to said second panel and forming a pocket therebetween for holding the data disk, said pocket having an opening thereto for receiving the data disc; and
(d) said first and second panels being constructed and arranged such that said pocket opening will be bound shut during a bindery process, thereby enclosing the data disk within said pocket in secure relation.

32. A data disk holder suitable for binding, comprising:
(a) a first panel of pliable heat-sealable material;
(b) a second panel comprising a lamination of heat-sealable material and a relatively rigid backing material;
(c) at least one heat seal connecting said first panel to said second panel and forming a space therebetween for holding the data disk; and
(d) said first and second panels have corresponding opposing unsealed peripheral portions defining a disk receiving opening therebetween, at least one of said panels carrying an adhesive layer adjacent said opening for adhering said panels together.

33. A data disk holder suitable for binding, comprising:
(a) a first panel of pliable heat-sealable material;
(b) a second panel comprising a lamination of heat-sealable material and a relatively rigid backing material;
(c) at least one heat seal connecting said first panel to said second panel and forming a space therebetween for holding the data disk; and
(d) said first and second panels have corresponding opposing peripheral portions defining a disk receiving opening therebetween.

* * * * *

UNITED STATES PATENT AND TRADEMARK OFFICE
CERTIFICATE OF CORRECTION

PATENT NO. : 6,968,944 B2 Page 1 of 1
DATED : November 29, 2005
INVENTOR(S) : Timothy J. Hitchings It is certified that error appears in the above-identified patent and that said Letters Patent is hereby corrected as shown below:

Column 1,
Line 67, the sentence starting with "Safety is also…" should start a new paragraph.

Column 2,
Line 12, "U.S. Pat. Ser. No. 5,713,605" should read -- U.S. Pat. No. 5,713,605 --.
Lines 38 and 39, "U.S. Ser. Pat. No. 6,360,889" should read
-- U.S. Pat. No. 6,360,889 --.

Column 3,
Line 28, delete "10".

Column 6,
Line 22, the sentence starting with "To further prevent…." should start a new paragraph.

Column 8,
Line 56, "bolder" should read -- holder --.
Line 59, "packet" should read -- pocket --.

Column 10,
Lines 1-3, subparagraph "(e)", should read -- (c) --.

Column 11,
Line 33, "bolder" should read -- holder --.

Signed and Sealed this

Twenty-first Day of March, 2006

JON W. DUDAS
*Director of the United States Patent and Trademark Office*